July 24, 1951     P. F. WHITE     2,561,961
STEERING WHEEL SPINNER
Filed Nov. 23, 1948
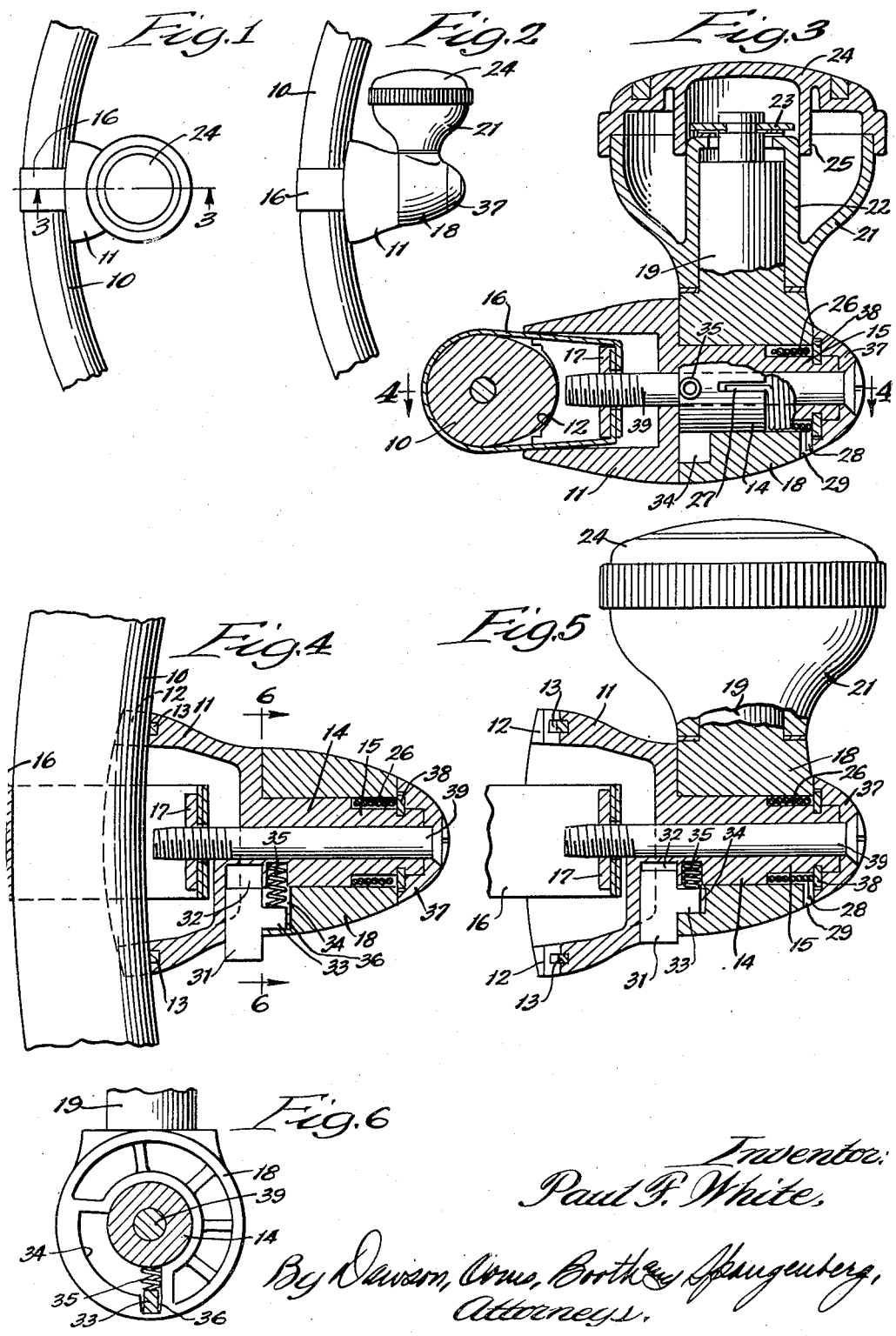

Patented July 24, 1951

2,561,961

UNITED STATES PATENT OFFICE 2,561,961

STEERING WHEEL SPINNER

Paul F. White, Glen Ellyn, Ill., assignor to Santay Corporation, Chicago, Ill., a corporation of Illinois Application November 23, 1948, Serial No. 61,658

4 Claims. (Cl. 74—557)

This invention relates to steering wheel spinners and more particularly to spinners which are foldable to move from operative to inoperative position.

One of the objects of the invention is to provide a spinner which is movable about an axis generally radial to the steering wheel rim to an upright operative position or to an inoperative position substantially in the plane of the steering wheel. Preferably, the spinner lies on the inner side of the wheel rim to leave the rim substantially unobstructed when the spinner is in its inoperative position.

Another object is to provide a spinner which is urged to its inoperative position by a spring and which may be latched in its operative position.

Still another object is to provide a spinner which is simple and inexpensive to manufacture and which is easy to install on a steering wheel. According to one feature of the invention a single screw serves both to clamp the spinner to the wheel and to hold the spinner parts assembled.

The above and other objects and advantages of the invention will be more readily apparent when read in connection with the accompanying drawing, in which—

Figure 1 is a partial plan view of a steering wheel equipped with a spinner embodying the invention showing the spinner in operative position;

Figure 2 is a view similar to Figure 1 showing the spinner in inoperative position;

Figure 3 is a section on the line 3—3 of Figure 4;

Figure 4 is a section on the line 4—4 of Figure 3;

Figure 5 is a partial section similar to Figure 4 showing the spinner knob in inoperative position; and Figure 6 is a section on the line 6—6 of Figure 4.

The spinner of the present invention can be mounted on any conventional type of steering wheel having an annular rim as shown at 10 which is connected by suitable spokes or the like to a central wheel hub. The spinner itself comprises a hollow body 11 which may be in the form of a die casting or the like and which has curved jaw portions 12 adjacent its edges to fit against the inner surface of the steering wheel rim. The jaw portions may, if desired, be provided with pads 13 to engage the wheel rim to provide a better grip against the rim. At one end the body has projecting therefrom a tubular stepped spindle 14 having a portion of maximum diameter adjacent the body and a portion 15 of reduced diameter at its outer end. When the body is mounted on a steering wheel rim, the spindle will extend radially inward from the rim, as shown.

To secure the body to a rim clamping means are provided shown as including a flexible strap 16 to extend around the rim and having its ends overlapping against a threaded block 17. The ends of the strap may be secured to the block 17 or may loosely overlie the same, if desired, and are formed with openings registering with a threaded opening in the block. The strap 16 is adapted to extend around the steering wheel rim, as seen, for example, in Figure 3, and when the block 17 is drawn into the hollow body 11 the jaw portions 12 of the body will be drawn securely against the rim to clamp the body securely thereto.

The spindle 14 rotatably carries a knob having a tubular hub portion 18 which fits rotatably on the spindle and an outwardly extending post 19 integral with the hub portion. The post 19 rotatably carries a knob formed by a hollow lower knob part 21 having a tubular hub 22 to fit rotatably over the post 19. At its upper end the post is formed with a reduced extension having a groove therein to receive a C-washer 23 to hold the lower knob part 21 on the post. The knob is completed by a cover part 24 fitting over the lower body part and cemented or otherwise secured thereto. The cover 24 may have a sleeve 25 thereon to extend over the hub part 22 and to hold the C-washer 23 against accidental displacement as more particularly described and claimed in the Patent to Deer, No. 2,441,061. With this construction the knob is secured to the hub portion 18 and can rotate freely about the post 19.

The knob is adapted to move from an upright operative position, as shown in Figures 1 and 3, to an inoperative position, as shown in Figures 2 and 5, in which it lies generally in the plane of the steering wheel rim. The knob is normally urged to its inoperative position by a coil spring 26 coiled about the reduced extension 15 of the spindle 14 and having one end, as shown at 27, extending into a slot in the spindle 14. The opposite end of the spring extends radially outward therefrom as shown at 28 and is received in a notch 29 in the hub 18. The spring is so tensioned when the hub is mounted on the spindle that it urges the knob toward its inoperative position as shown in Figures 2 and 5.

The knob is held in its operative position for use by a latch comprising a T-shaped bar 31 slidable radially of the spindle in a groove 32 formed in the body 11. As seen in Figures 4 and 5, the cross bar of the T lies in the groove 32 and the base 33 of the T extends into a circumferential groove 34 formed in the hub 18. The latch is urged outward by a compression spring 35 lying in a recess in the spindle 14 and engaging the projection 33 of the latch to urge it outward. At one end of the recess 34 a notch 36 is provided to receive the projection 33 of the latch as best seen in Figures 4 and 6.

When the knob is in its inoperative position, as shown in Figures 2 and 5, the latch is pressed inward and the projection 33 thereon lies in the recess 34. At this time the knob is free to turn on the spindle and the spring 26 will urge it to its inoperative position in which it lies substantially in the plane of the steering wheel rim. Engagement of the projection 33 with the end of the recess 34 will limit movement of the knob to this position. To move the knob to its operative position the operator needs only to grasp it and turn it to the position shown in Figures 1 and 3. When the knob is upright the projection 33 will register with the notch 36 and will be moved into the notch by the spring 35 to latch the knob securely in its upright position. At this time the knob projects upward from the plane of the wheel in a position to be used conveniently by the operator. To release the latch the operator may press inward on the latch bar 31 moving it from the position of Figure 4 to the position of Figure 5 and at the same time moving the projection 33 out of the notch 36 so that the spring 26 can again move the knob to its inoperative position. It will be seen that in the inoperative position the knob lies adjacent to the inner edge of the steering wheel rim in a position where it presents minimum interference to use of the steering wheel and where it occupies a minimum amount of space within the rim.

In order to hold the knob parts assembled and to operate the clamp mechanism a cap 37 is fitted over the outer end of the reduced spindle portion 15. The cap may be recessed to receive a C-washer 38 fitting into a groove in the spindle portion 15 which normally functions to prevent accidental removal of the knob. A screw 39 extends through the cap and through the spindle to thread into the block 17 thereby drawing the block into the spinner body 11 to clamp it to the wheel rim and at the same time drawing the cap 37 against the spindle to hold the C-washer 38 and the knob hub assemled on the spindle.

To mount the spinner it is necessary only to loosen the screw 39 to release the strap 16 so that it can be wrapped around a wheel rim and to assemble the ends of the strap and the block 17 on the end of the screw, as shown. When the screw is tightened, it will draw the block 17 into the hollow body 11 to clamp the body securely on the wheel rim and at the same time will draw the cap 37 tightly against the outer end of the spindle. Thus the parts can be assemled quickly and easily by means of a single screw.

While one embodiment of the invention has been shown and described in detail herein, it will be understood that this is illustrative only and is not to be taken as a definition of the scope of the invention, reference being had for this purpose to the appended claims.

What is claimed is:

1. A steering wheel spinner comprising a body, clamping means on the body to connect it to the rim of a steering wheel, a spindle on the body projecting radially inward from the steering wheel rim when the body is mounted, a knob having a tubular hub portion rotatably mounted on the spindle for movement of the knob from an upright operative position to an inoperative position generally in the plane of the wheel, a spring urging the knob to its inoperative position, and a latch bar mounted on the body for radial sliding thereon, a lateral projection on the latch bar extending into the hub portion, the hub portion being formed with a notch to receive the projection, and a spring urging the latch bar toward the notch.

2. A steering wheel spinner comprising a body, clamping means on the body to connect it to the rim of a steering wheel, a spindle on the body projecting radially inward from the steering wheel rim when the body is mounted, a knob having a tubular hub portion rotatably mounted on the spindle for movement of the knob from an upright operative position to an inoperative position generally in the plane of the wheel, a spring urging the knob to its inoperative position, the body having a laterally extending recess therein, a latch bar slidable in the recess and having a projection thereon projecting into a circular recess in the knob hub portion, and the knob hub portion having a lateral notch oepning into the circular recess to receive the latch projection thereby to latch the knob in its operative position.

3. A steering wheel spinner comprising a body, clamping means on the body to connect it to the rim of a steering wheel, a spindle on the body projecting radially inward from the steering wheel rim when the body is mounted, a knob having a tubular hub portion rotatably mounted on the spindle for movement of the knob from an upright operative position to an inoperative position generally in the plane of the wheel, a spring urging the knob to its inoperative position, said spring comprising a coil spring coiled around the spindle anchored at one end to the spindle and at its other end to the knob hub portion, and a latch carried by the body to latch the knob in its operative position.

4. A steering wheel spinner comprising a hollow body, clamping means carried by the body to clamp it to a steering wheel rim and including a threaded block shiftable in the hollow body, a tubular spindle projecting from one end of the body, a knob having a tubular hub rotatably mounted on the spindle, a cap fitting over the end of the spindle to hold the knob thereon, and a screw extending through the cap and the spindle and threaded into the block to operate the clamping means and to hold the knob assembled on the spindle.

PAUL F. WHITE.

REFERENCES CITED

The following references are of record in the file of this patent:

UNITED STATES PATENTS

| Number | Name | Date |
|---|---|---|
| 1,866,111 | Jones | July 5, 1932 |
| 2,101,519 | Thorp | Dec. 7, 1937 |
| 2,139,546 | Hansen | Dec. 6, 1938 |

FOREIGN PATENTS

| Number | Country | Date |
|---|---|---|
| 753,244 | France | Oct. 11, 1933 |
| 825,212 | France | Feb. 25, 1938 |